W. Lyon,
Tether.
No. 113,318.  Patented Apr. 4, 1871.
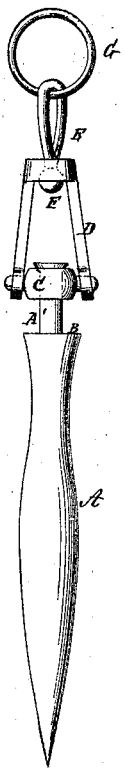
Witnesses:
A. W. Almqvist
L. S. Mabee
Inventor:
W. Lyon
per Munn & Co
Attorneys.

UNITED STATES PATENT OFFICE.

WILLIAM LYON, OF CAMP HALLECK, NEVADA.

IMPROVEMENT IN SWIVEL-PINS FOR TETHERING ANIMALS.

Specification forming part of Letters Patent No. 113,318, dated April 4, 1871.

*To all whom it may concern:*

Be it known that I, WILLIAM LYON, of Camp Halleck, in the county of Lander and State of Nevada, have invented a new and useful Improvement in Swivel-Pin for Tethering Animals; and I do hereby declare that the following is a full, clear, and exact description thereof, which will enable others skilled in the art to make and use the same, reference being had to the accompanying drawing, forming part of this specification.

This invention relates to a new and useful improvement in a pin for tethering horses and other animals; and consists in the construction and arrangement of parts, as hereinafter described.

The accompanying drawing is a view of a tethering-pin constructed according to my invention.

The object is to so construct a tethering-pin that a horse, mule, or other animal cannot wind up, knot, and tangle the rope (by which he is fastened) around the pins, thus shortening his tether, with a tendency to loosen the pin so that it may be readily drawn from the ground and allow the animal to escape.

For this purpose I form the top end of the pin A with a neck, A', and shoulder B, on which I place the yoke C, which is confined on the neck by riveting the end down, as seen in the drawing; but the yoke is allowed to turn or revolve freely on the neck.

D is a swivel-clevis, which is fitted onto the ends of the yoke, so that it will readily turn, the ends of the yoke serving as journals, and being riveted so as to confine the clevis to the journals. E is the swivel-loop, which is confined in the head of the clevis by riveting, as seen at F. G is a ring, to which the tether or rope is attached.

It will be seen by this arrangement that the rope cannot be wound up on the pin, but that the swivel will turn in any direction, so that the rope cannot be knotted, twisted, or tangled round it. Thus the swivel-clevis D, the yoke C, and the loop E have three separate and distinct movements.

Were the clevis D not arranged to swing vertically on the yoke C it would sometimes happen that the animal tethered by the pin would draw the rope or strap directly over or close beside the head of the neck A', and in such a manner that the yoke would not turn, at least not readily, and thus an opportunity would occur for the strap to be wound about the neck of the pin, or, what is more probable, the neck would be broken by a severe or sudden strain or pull.

Having thus described my invention, I claim as new and desire to secure by Letters Patent—

The improved tethering-pin herein described, consisting of the body A, provided with the neck A', the yoke C, the swivel-clevis D, and swivel-loop E, all constructed and arranged as shown and described.

WILLIAM LYON.

Witnesses:
 JNO. HARDIE,
 RICHD. HARRINGTON.